(12) United States Patent
Missotten et al.

(10) Patent No.: US 10,070,590 B2
(45) Date of Patent: Sep. 11, 2018

(54) CLEANING ASSEMBLY FOR A HARVESTER

(71) Applicant: CNH Industrial America LLC, New Holland, PA (US)

(72) Inventors: Bart M. A. Missotten, Herent (BE); Frank R. G. Duquesne, Zwevegem (BE); Tom N. N. Somers, Aalter (BE)

(73) Assignee: CNH Industrial America LLC, New Holland, PA (US)

( * ) Notice: Subject to any disclaimer, the term of this patent is extended or adjusted under 35 U.S.C. 154(b) by 85 days.

(21) Appl. No.: 14/904,453

(22) PCT Filed: Jul. 11, 2014

(86) PCT No.: PCT/EP2014/064925
§ 371 (c)(1),
(2) Date: Jan. 12, 2016

(87) PCT Pub. No.: WO2015/004268
PCT Pub. Date: Jan. 15, 2015

(65) Prior Publication Data
US 2016/0192591 A1    Jul. 7, 2016

(30) Foreign Application Priority Data

Jul. 12, 2013    (BE) .................................. 2013/0486

(51) Int. Cl.
*A01F 12/48*    (2006.01)
*A01F 12/44*    (2006.01)
*A01F 12/46*    (2006.01)

(52) U.S. Cl.
CPC .......... *A01F 12/444* (2013.01); *A01F 12/446* (2013.01); *A01F 12/448* (2013.01); *A01F 12/46* (2013.01)

(58) Field of Classification Search
CPC ..... A01F 12/444; A01F 12/446; A01F 12/448
(Continued)

(56) References Cited

U.S. PATENT DOCUMENTS 2,228,228 A    1/1941   Sinclair
3,373,871 A *  3/1968   Huether ................ A01F 12/442
                                                    209/284
(Continued)

FOREIGN PATENT DOCUMENTS

EP           1378161 A1      1/2004
GB           2224423 A       5/1990
WO       WO2013028748   *   2/2013      ............ A01F 12/44

*Primary Examiner* — Thomas B Will
*Assistant Examiner* — Mai T Nguyen
(74) *Attorney, Agent, or Firm* — Patrick M. Sheldrake

(57) ABSTRACT

A cleaning assembly for a harvester has a fan assembly with a fan and a first fan outlet and a second fan outlet, a first sieve assembly with at least one reciprocable sieve, an upstream end of the first sieve assembly near the first fan outlet such that air from the first fan outlet flows along the first sieve assembly and a direction of crop flow; and a second sieve assembly has at least one reciprocable sieve, an upstream stream end of the second sieve assembly near the second fan outlet such that the air from the second fan outlet flows along the second sieve assembly and the direction of crop flow, the second sieve assembly has a clean grain auger for receiving cleaned grain, and the first sieve assembly has a further clean grain auger arranged for receiving cleaned grain.

13 Claims, 2 Drawing Sheets

(58) Field of Classification Search
USPC .................................................. 460/97–102
See application file for complete search history.

(56) References Cited

U.S. PATENT DOCUMENTS

| | | | | |
|---|---|---|---|---|
| 3,800,804 A | * | 4/1974 | Boone | A01F 12/444 |
| | | | | 415/53.3 |
| 4,531,528 A | | 7/1985 | Peters et al. | |
| 4,589,425 A | * | 5/1986 | Mitchell, Jr. | A01F 12/444 |
| | | | | 460/99 |
| 5,387,154 A | * | 2/1995 | Peters | A01F 12/444 |
| | | | | 460/100 |
| 5,699,656 A | | 12/1997 | Hamada et al. | |
| 5,795,223 A | * | 8/1998 | Spiesberger | A01F 12/448 |
| | | | | 460/102 |
| 7,413,507 B2 | * | 8/2008 | Weichholdt | A01F 12/446 |
| | | | | 460/100 |
| 7,833,091 B2 | * | 11/2010 | Holtmann | A01D 41/12 |
| | | | | 460/114 |
| 8,608,534 B1 | * | 12/2013 | Stahl | A01F 12/444 |
| | | | | 460/99 |
| 9,462,752 B2 | * | 10/2016 | Farley | A01F 12/446 |
| 2009/0264169 A1 | * | 10/2009 | Ricketts | A01F 12/446 |
| | | | | 460/101 |
| 2014/0200057 A1 | * | 7/2014 | Farley | A01F 12/446 |
| | | | | 460/100 |

* cited by examiner

CLEANING ASSEMBLY FOR A HARVESTER

This application is the US National Stage filing of International Application Serial No. PCT/EP2014/064925 filed on Jul. 11, 2014 which claims priority to Belgian Application BE2013/0486 filed Jul. 12, 2013, each of which is incorporated herein by reference in its entirety.

FIELD OF THE INVENTION

The present invention generally relates to a cleaning assembly for a harvester, such as a combine harvester, operable to clean a crop, while moving along a direction of the crop flow from an upstream entrance to a downstream exit.

BACKGROUND OF THE INVENTION

In a combine harvester, after a crop has been cut, it is passed through a thresher which acts to separate the grain from the stalks or the straw. The straw is transported to the back of the harvester by means of straw walkers, while the grain and other crop particles are dropped onto one or more sieves. The material other than grain (hereafter further abbreviated with "MOG") comprises chaff, short straw and other particles that the thresher has separated from the longer straw stems. The one or more sieves are reciprocated while air is blown upwards through it. The shaking of the sieve(s) distributes the grain evenly over the area of the sieve(s) and conveys the grain and MOG towards the back of the harvester. The grain that drops through the sieve(s) is collected in a sieve box using a grain auger (also called collecting trough) from which it is transported to a grain tank.

In GB 2224423, a combine harvester is described having a grain collecting and cleaning apparatus having a lower sieve element and three vertically spaced and offset upper sieve elements. The apparatus comprises a blower having a main outflow and an additional channel. The outflow openings of the additional channel are so arranged that a drop step between a stepped base disposed under a threshing basket and the front upper sieve element as well as the region below and behind the front upper sieve element are subjected to an air current. The middle and rear upper sieve elements are acted on by an air current from the main outflow channel of the blower. The grains separated out at the middle and rear upper sieve elements and other admixtures pass to the lower sieve element and are there subjected to a repeated sieving operation. The separated grains fall from the lower sieve element onto a grain base, which extends obliquely and at the lower end of which a grain worm is arranged operable to convey the grains to an elevator conveyor mounted laterally beside the machine frame. The stock mixture, which has been separated in the end region of the rear upper sieve element and the lower sieve element and consists predominantly of grain and short straw components, passes by way of a return base to a transverse conveyor worm, which conveys the stock mixture into a mixture elevator.

In this grain collecting and cleaning apparatus, the blower is thus located at the upstream end this apparatus. The disadvantage thereof is that air is directed to the rear, but not sufficient relative to the huge length. There is too much air in front and not enough at the rear. This means that the fan will blow grain and MOG with a strong air blast towards the rear and there MOG will fall through the cleaning sieve, as there is no wind. Consequently, no efficient use of the available surface for sieve activity is obtained.

In order to reduce that effect, one should increase the fan blast even more, ensuring the grain to be blown out of the combine. This however is a very unstable cleaning, hard to adjust, with a bad grain sample as a consequence. Trying to improve the grain sample will reduce the capacity and vice versa.

In U.S. Pat. No. 4,531,528, a cleaning shoe arrangement is disclosed having a generally horizontal and planar receiving element, receiving material from the threshing and separating sections and conveying at least a portion of it rearwardly to a chaffer having a downstream discharge edge and offset rearwardly and downwardly from the receiving element. A sieve immediately below the chaffer receives material passing downwards through the openings of the chaffer. A blower mounted ahead of and somewhat below the chaffer and sieve provides a rearwardly and upwardly directed air blast to the underside of those elements to assist their screening operation. Clean grain passing downwards through the sieve is intercepted by a forwardly and downwardly sloping floor which delivers it to a clean grain auger. At least some of the material carried rearwardly by the chaffer and sieve finds its way into the tailings auger. The receiving element further includes a foraminous portion having a series of conventional fingers extending at the downstream delivery edge thereof. A deflector carried by this receiving element extends laterally over its full width and extends downwardly and forwardly from adjacent this downstream edge. Closely spaced beneath and extending almost the full length of the sieve portion of the receiving element is a grain pan. The blower has suitable outlets so that air may be delivered rearwardly and upwardly to the underside of the main chaffer and the sieves, respectively, by a main duct and also rearwardly and upwardly onto the underside of the sieve portion of the receiving element by means of a forwardly directed duct cooperating with a deflector or scoop. A transversely extending sheet metal deflector portion is disposed so as to receive crop material passing over the rearward edge of the grain pan. The deflector surfaces cooperate to control the combined flow of grain from the grain pan and the downstream section of the sieve portion so that it passes well forward of the main sieve assembly and is released approximately vertically above a transversely extending downwardly and rearwardly sloping portion of the trough of the clean grain auger.

By locating a fan in the middle, a well balanced wind distribution is ensured, left to right, front to rear.

The problem with this cleaning shoe arrangement however is that clean grain from the receiving element that is falling onto the grain pan and that is guided by means of the deflector surfaces towards the clean grain auger, being the major part of the cleaned grain, falls in front of the main duct of the blower. This reduces the efficiency of the airflow and increases grain loss.

Object of the Invention

The invention thus seeks to provide a cleaning assembly for a harvester having a well-balanced air distribution, having an efficient airflow and at the same time having a minimal grain loss.

SUMMARY OF THE INVENTION

According to a first aspect of the invention, there is provided a cleaning assembly for a harvester operable to clean a crop, while moving along a direction of the crop flow, comprising:

a fan assembly comprising:
  a fan operable to rotate about a rotation axis transverse to the direction of the crop flow for generating a flow of air; and
  a first fan outlet and a second fan outlet operable to output the flow of air generated by the fan, the first fan outlet being arranged at an upstream side of the rotational axis and the second fan outlet being arranged at a downstream side of the rotational axis;
a first sieve assembly comprising at least one reciprocable sieve and extending along the direction of the crop flow, an upstream end of the first sieve assembly being arranged near the first fan outlet such that the flow of air output by the first fan outlet generally flows along the first sieve assembly along the direction of the crop flow; and
a second sieve assembly comprising at least one reciprocable sieve and extending along the direction of the crop flow, an upstream end of the second sieve assembly being arranged near the second fan outlet such that the flow of air output by the second fan outlet generally flows along the second sieve assembly along the direction of the crop flow, the second sieve assembly further comprising a clean grain auger arranged below the second sieve assembly for receiving cleaned grain therefrom, wherein the first sieve assembly further comprises a further clean grain auger arranged below the first sieve assembly for receiving cleaned grain therefrom.

The advantage of arranging the further clean grain auger below the first sieve assembly for receiving cleaned grain therefrom is that the grain of the first cleaning does not have to pass anymore in front of the second fan outlet. This increases the efficiency of the airflow and decreases grain loss. This arrangement also prevents that grain passing in the vicinity of this second fan outlet is blown away, allowing an efficient use of the available surface for sieve activity.

A further advantage is that by locating the fan in between the two clean grain augers, a well-balanced wind distribution on both sieve areas is obtained.

Still a further advantage is that there is no need for a return system on the first cleaning by the first sieving assembly since the return of the first cleaning goes towards the second cleaning performed by the second sieving assembly. Clean grain of the first cleaning goes to the clean grain elevator, but not into the auger case, meaning earlier grain evacuation.

In an advantageous embodiment of a cleaning assembly according to the invention, the further clean grain auger is arranged transverse to the direction of the crop flow of the first fan outlet.

In a favourable embodiment of a cleaning assembly according to the invention, the further clean grain auger is operable to receive cleaned grain from an inclined grain return pan arranged below the first sieve assembly.

In a preferred embodiment of a cleaning assembly according to the invention, the further clean grain auger is arranged below the air flow outputted at the first fan outlet, and/or the clean grain auger is arranged below the air flow outputted at the second fan outlet.

This has the advantage that the efficiency of the airflow is further increased.

In an advantageous embodiment of a cleaning assembly according to the invention, the first and second sieve assembly comprises a plurality of reciprocable sieves.

In a favourable embodiment of a cleaning assembly according to the invention,
the first sieve assembly comprises at least one reciprocable first upper sieve(s) and one reciprocable first lower sieve arranged below the first upper sieve(s); and
the second sieve assembly comprises at least one reciprocable second upper sieve(s) and at least one reciprocable second lower sieve arranged below the second upper sieve(s).

In a preferred embodiment of a cleaning assembly according to the invention,
the first upper sieve(s) is (are) operable to reciprocate in counter-phase with the first lower sieve(s);
the second upper sieve(s) is (are) operable to reciprocate in counter-phase with the second lower sieve(s); and
the first upper sieve(s) is (are) operable to reciprocate in counter-phase with the second upper sieve(s).

More preferably, the first and/or second sieve assembly comprises two upper sieves.

The plurality of sieves of the first and/or second sieve assembly are preferably configured to perform cascade cleaning in combination with the fan. This has the advantage that a better cleaning of the grain is obtained.

In a favourite cleaning assembly according to the invention, the cleaning assembly comprises a first grain pan located after the upper sieve of the first sieve assembly and providing a bridge for the grain MOG mixture to the second sieve assembly, wherein the cleaning assembly comprises a system for preblowing after the first grain pan.

This has the advantage that the lighter chaff already is blown away.

In an advantageous cleaning assembly according to the invention, the cleaning assembly comprises one single shaker shaft operable to reciprocate the sieves.

Consequently, the driving of the sieves of the cleaning assembly is not complex. The cleaning assembly is easily optimizable for functional performance and sample quality (throwing angles, strokes, etc.) No extra hanger and rocker arms are necessary.

In order to compensate the slope of the ground on which the harvester is travelling, the cleaning assembly according to the invention may comprise a side slope compensating system operable to vary the lateral movement of the sieves.

In order to compensate the slope of the ground on which the harvester is travelling, the cleaning assembly comprises a mechanism for moving the sieves in mutually orthogonal directions.

In case of longer rotors towards the rear, for more threshing capacity, in a possible embodiment of a cleaning assembly according to the invention, the cleaning assembly comprises a shaker plate located after the downstream end of and above the first sieve assembly and being operable to reciprocate against the direction of the crop flow to drop crop back in the area where the blast of the fan is highest between the first and the second sieve assembly.

According to a second aspect of the invention, there is provided a method of operating the cleaning assembly according to the invention as described above, wherein a sieve control system controls the setup of the operational input parameters of the first and second sieve assemblies.

Preferably, the sieve control system performs the step of receiving from inputs and/or sensors separated operational input parameters associated with the first and second sieve assembly, the operational input parameters comprising for the first and second sieve assembly at least one value representative of:
  the frequency of the shaking movement of the first and second sieve assembly;
  the stroke of the shaking movement of the first and second sieve assembly;
  the sieve opening.

DETAILED DESCRIPTION OF EMBODIMENT(S)

Figure 1:
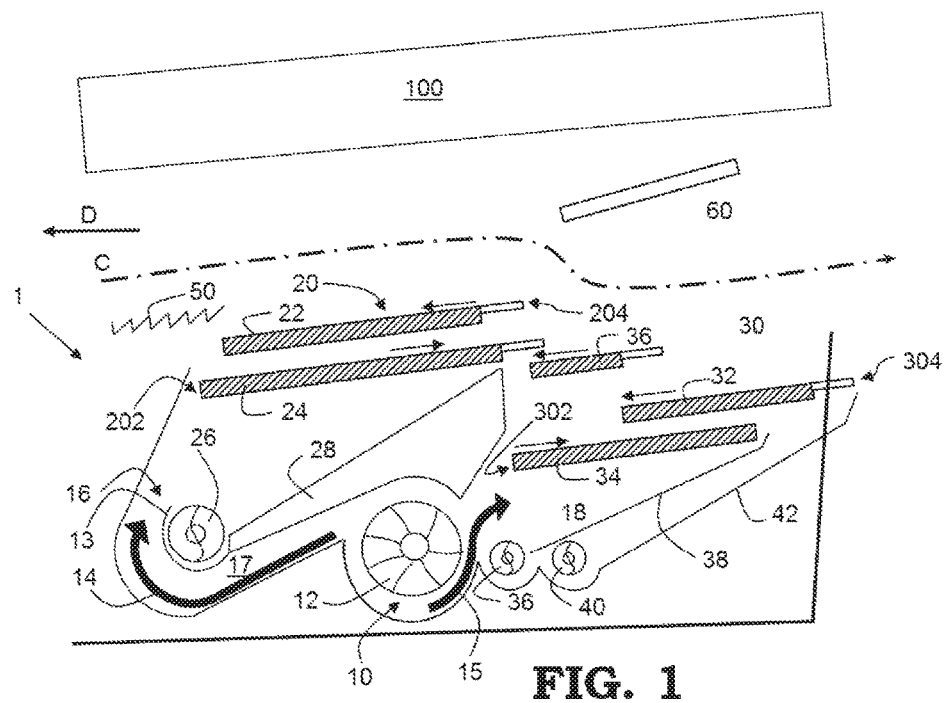
FIG. 1 illustrates a front view of a schematic view of an embodiment of a cleaning assembly according to the invention.
Figure 2:
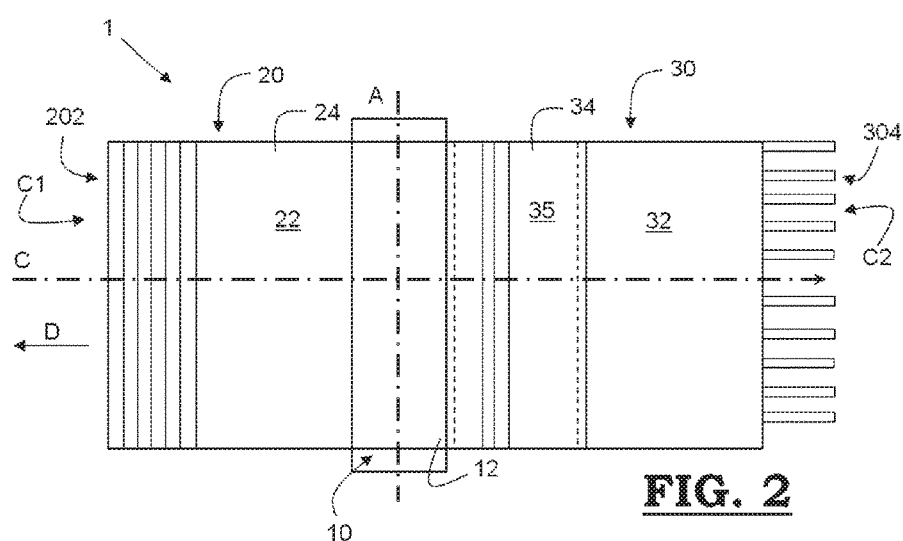
FIG. 2 illustrates a top view of the schematic view as shown in FIG. 1.

A cleaning assembly (1) according to the invention for a harvester operable to clean crop (not shown on the figures) while moving along a direction of the crop flow (C) from an upstream entrance (C1) to a downstream exit (C2), as shown in FIGS. 1 and 2, comprises firstly a fan assembly (10). This direction of the crop flow (C) is opposite to the driving direction (D) of the harvester.

This fan assembly (10) comprises a fan (12) (also called blower) that is operable to rotate about a rotation axis (A) (see FIG. 2) transverse to the direction of the crop flow (C) for generating an air flow. The fan assembly (10) comprises a first fan outlet (16) and a second fan outlet (18) operable to output the flow of air (14, 15) generated by the fan (12). The first fan outlet (16) is arranged at an upstream side of the rotational axis (A) and the second fan outlet (18) is arranged at a downstream side of the rotational axis (A).

The cleaning assembly (1) according to the invention as shown in FIGS. 1 and 2 also comprises a first sieve assembly (20) and a second sieve assembly (30). The upstream end (202) of the first sieve assembly is arranged near the first fan outlet (16) such that the air flow from the first fan outlet (16) generally flows along the first sieve assembly (20) and the direction of the crop flow (C). The upstream end (302) of the second sieve assembly (30) is arranged near the second fan outlet (18) such that the air flow from the second fan outlet (18) generally flows along the second sieve assembly (30).

The embodiment of the cleaning assembly as shown in FIGS. 1 and 2 has a first sieve assembly (20) comprising a first upper sieve (22) and a first lower sieve (24) arranged below this first upper sieve (22), while the second sieve assembly (30) comprises two second upper sieves (32, 36) and a second lower sieve (34) arranged below these two second upper sieves (32, 36). All sieves (22, 24, 32, 34, 36) are extending along the direction of the crop flow (C). As can be seen in FIG. 1, the different sieves (22, 24, 32, 34, 36) are configured to perform cascade cleaning.

The fan (10) provides a rearwardly and upwardly directed air blast to the underside of the different sieves (22, 24, 32, 34, 36) to assist their screening operation.

The different sieves (22, 24, 32, 34, 36) are reciprocable with respect to each other in the following way:

the first upper sieve (22) is reciprocable in counter-phase with the first lower sieve (24);

the second upper sieves (32, 36) are reciprocable in counter-phase with the second lower sieve (34); and the first upper sieve (22) is reciprocable in counter-phase with the second upper sieves (32, 36).

Figure 3:
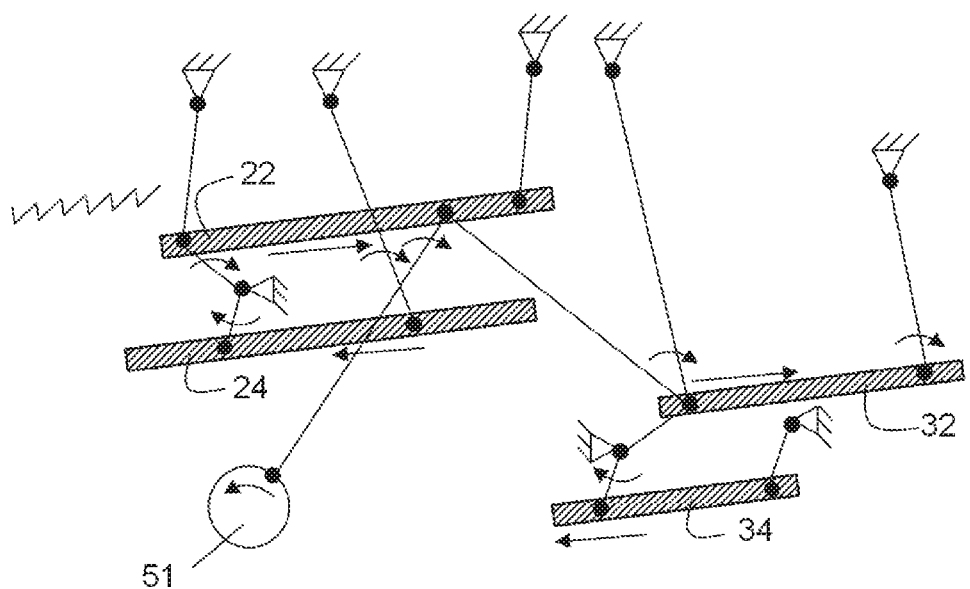
FIG. 3 illustrates a schematic view of the linkages between the different sieves to drive and shake these sieves.

In FIG. 3, the different linkages to drive the reciprocating movement of the different sieves (22, 24, 32, 34, 36) are shown. As can be seen therein, only one single shaker shaft (51) is necessary to reciprocate the sieves (22, 24, 32, 34, 36). It should however be remarked that instead of a single shaker shaft (51), also two or more shaker shafts can be used to separate the movement of the upper and the lower sieves (22, 24, 32, 34, 36). Also when using two or more shaker shafts, the movement of these upper and lower sieves (22, 24, 32, 34, 36) can be controlled dependently or independently from each other.

As can be seen in FIG. 1, the second sieve assembly (30) comprises a clean grain auger (36) arranged below the second sieve assembly (30) and preferably below the air flow outputted at the second fan outlet (18). The clean grain auger (36) is located below the air flow outputted at the second fan outlet (18). Clean grain passing through the sieves (32, 34, 36) of the second sieve assembly (30) is intercepted by an inclined grain return pan (38) arranged below the second sieve assembly (30) which delivers it to the clean grain auger (36).

The first sieve assembly (20) comprises a further clean grain auger (26) arranged below the first sieve assembly (20) and preferably below the air flow outputted at the first fan outlet (16). This further clean grain auger (26) is arranged transverse to the direction of the crop flow (C) at the first fan outlet (16). Clean grain passing through the sieves (22, 24) of the first sieve assembly (20) is intercepted by a further inclined grain return pan (28) arranged below the first sieve assembly (20) which delivers it to the further clean grain auger (26). As can be seen in FIG. 1, this further clean grain auger (26) is located in a deflector (13) of the air duct (17) that is in connection with the first fan outlet (16).

As can be seen in FIG. 1, the cleaning assembly (1) also comprises a return grain auger (also called tailings auger) (40) operable for transporting tailings to a separate threshing cylinder. This return grain auger (40) is operable to receive cleaned grain from a third inclined grain return pan (42).

The cleaning assembly (1) according to the invention can comprise a first grain pan (50) located after the upper sieve (22) of the first sieve assembly (20). It's easy to make this gran pan larger towards the front in case of a drum and concave in front of the rotors (not shown on the figures).

The cleaning assembly (1) according to the invention optionally comprises a side slope compensating system (not shown on the figures) operable to vary the lateral movement of the sieves (22, 24, 32, 34, 36).

The cleaning assembly (1) also optionally comprises a mechanism for moving the sieves (22, 24, 32, 34, 36) in mutually orthogonal directions to compensate the slope of the ground on which the harvester is travelling.

As is shown on FIG. 1, the cleaning assembly (1) according to the invention optionally comprises a shaker plate (60) located after the downstream end of the first sieve assembly (20) and above this first sieve assembly (20), more specifically the downstream end (204) of the first upper sieve (22). This shaker plate (60) is operable to reciprocate against the direction of the crop flow (C) to drop crop back in the area where the blast of the fan (12) is highest between the first and the second sieve assembly (20, 30). This is particularly useful in case of longer rotors (100) towards the rear for obtaining more threshing capacity.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A cleaning assembly for a harvester operable to clean a crop while moving along a direction of the crop flow, comprising
   a fan assembly comprising
      a fan operable to rotate about a rotation axis transverse to the direction of the crop flow for generating a flow of air; and
      a first fan outlet and a second fan outlet operable to output the flow of air generated by the fan, the first fan outlet being arranged at an upstream side of the rotational axis and the second fan outlet being arranged at a downstream side of the rotational axis; and
   a first sieve assembly comprising at least one reciprocable sieve and extending along the direction of the crop flow, an upstream end of the first sieve assembly being arranged near the first fan outlet such that the flow of air from the first fan outlet generally flows along the first sieve assembly and the direction of the crop flow; and
   a second sieve assembly comprising at least one reciprocable sieve and extending along the direction of the crop flow, an upstream end of the second sieve assembly being arranged near the second fan outlet such that the flow of air from the second fan outlet generally flows along the second sieve assembly and the direction of the crop flow, the second sieve assembly further comprising a clean grain auger arranged below the second sieve assembly for receiving cleaned grain therefrom,
   wherein the first sieve assembly comprises a further clean grain auger arranged below the first sieve assembly for receiving cleaned grain therefrom;
   wherein the first and second sieve assembly comprises a plurality of reciprocable sieves; and
   wherein the first sieve assembly comprises at least one reciprocable first upper sieve and at least one reciprocable first lower sieve arranged below the at least one reciprocable first upper sieve; and
   the second sieve assembly comprises at least one reciprocable second upper sieve and at least one reciprocable second lower sieve arranged below the at least one reciprocable second upper sieve.

2. A cleaning assembly according to claim 1, wherein the further clean grain auger is operable to receive cleaned grain from a further inclined grain return pan arranged below the first sieve assembly.

3. A cleaning assembly according to claim 1, wherein at least one of the further clean grain auger is arranged below the air flow outputted at the first fan outlet, and the clean grain auger is arranged below the air flow outputted at the second fan outlet.

4. A cleaning assembly according to claim 1, wherein
   the at least one reciprocable first upper sieve is operable to reciprocate in counter-phase with the at least one reciprocable first lower sieve;
   the at least one reciprocable second upper sieve is operable to reciprocate in counter-phase with the at least one reciprocable second lower sieve; and
   the at least one first upper is operable to reciprocate in counter-phase with the at least one reciprocable second upper sieve.

5. A cleaning assembly according to claim 1, wherein at least one of the first and second sieve assembly comprises two upper sieves.

6. A cleaning assembly according to claim 1, wherein the first and second sieve assemblies each have a plurality of sieves and wherein the plurality of sieves of at least one of the first and second sieve assembly are configured to perform cascade cleaning in combination with the fan.

7. A cleaning assembly according to claim 4, wherein the cleaning assembly comprises a first grain pan located after the upper sieve of the first sieve assembly, and in that the cleaning assembly comprises a system for preblowing after the first grain pan.

8. A cleaning assembly according to claim 1, further comprising a mechanism for moving the sieves in mutually orthogonal directions to compensate the slope of the ground on which the harvester is travelling.

9. A cleaning assembly according to claim 1, further comprising one single shaker shaft operable to reciprocate the sieves.

10. A cleaning assembly according to claim 1, further comprising a side slope compensating system operable to vary the lateral movement of the sieves.

11. A cleaning assembly according to claim 1, further comprising a shaker plate located after the downstream end of and above the first sieve assembly and being operable to reciprocate against the direction of the crop flow to drop crop back in the area where the blast of the fan is highest between the first and the second sieve assembly.

12. A method of operating the cleaning assembly according to claim 1, wherein a sieve control system controls the setup of the operational input parameters of the first and second sieve assemblies.

13. A method according to claim 12, wherein the sieve control system performs the step of receiving from at least one of inputs and sensors separated operational input parameters associated with the first and second sieve assembly, the operational input parameters comprising for the first and second sieve assembly at least one value representative of:
   the frequency of the shaking movement of the first and second sieve assembly;
   the stroke of the shaking movement of the first and second sieve assembly;
   the sieve opening.

* * * * *